Oct. 24, 1967   E. A. HENRY   3,348,410
DYNAMIC GAIN CONTROL FOR ULTRASONIC TESTERS
Filed Dec. 29, 1964   2 Sheets-Sheet 1

INVENTOR:
E. A. HENRY

BY Homer R. Montague
ATTORNEY

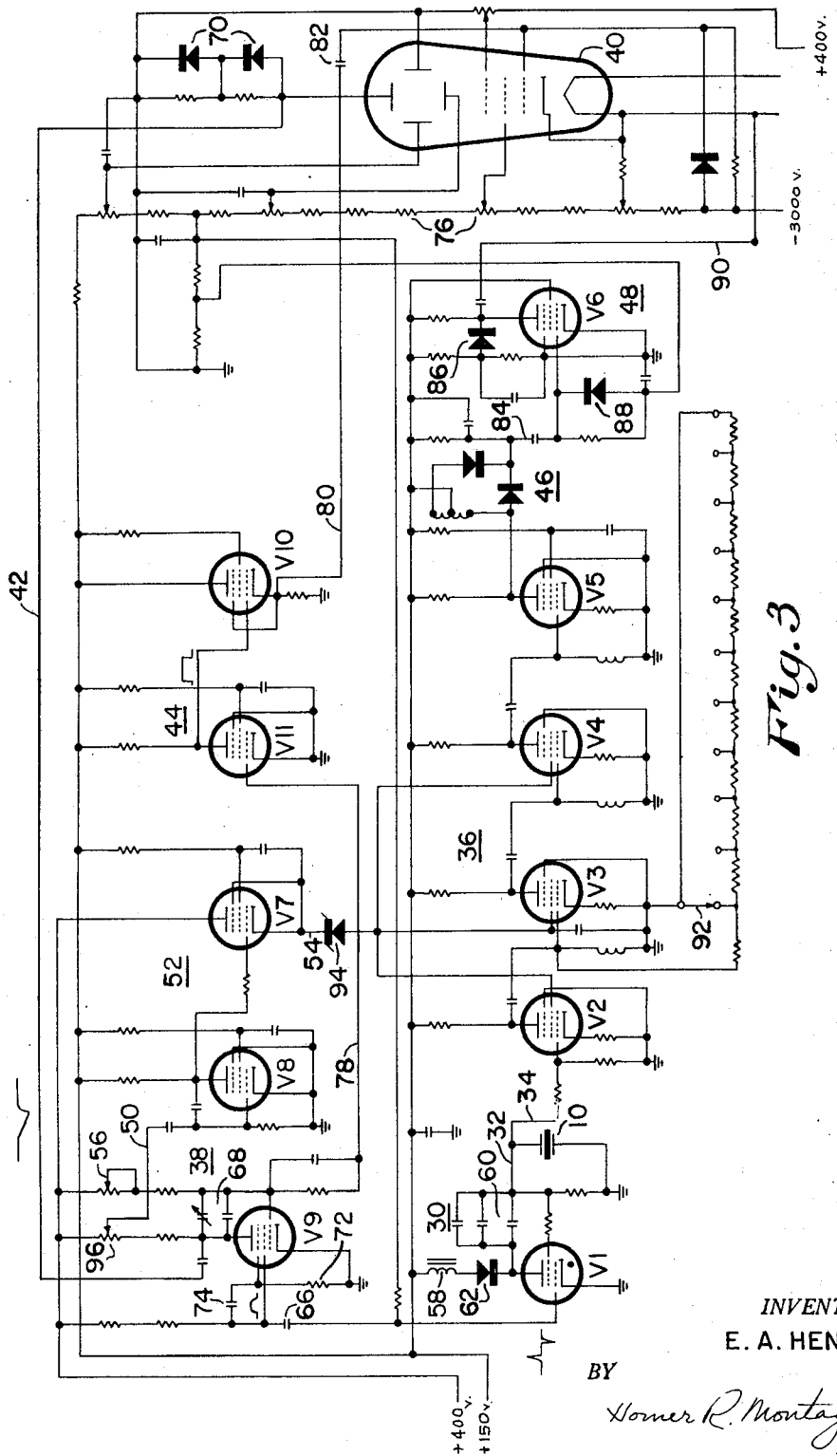

United States Patent Office 3,348,410
Patented Oct. 24, 1967

3,348,410
DYNAMIC GAIN CONTROL FOR
ULTRASONIC TESTERS
Elliott A. Henry, Newtown, Conn., assignor, by mesne assignments, to Branson Instruments Incorporated, Stamford, Conn., a corporation of Delaware
Filed Dec. 29, 1964, Ser. No. 421,927
4 Claims. (Cl. 73—67.8)

ABSTRACT OF THE DISCLOSURE

An ultrasonic pulse echo inspection device having a cathode ray type indicator. One set of deflection plates is activated in accordance with an adjustable sweep voltage for setting the desired range of inspection. An intensity-control electrode (e.g., the cathode) is activated by pulses from the ultrasonic transducer after amplification, to display the echos as pips spaced along the time (sweep) axis of the indicator tube. The gain of the amplifier is varied automatically by the sweep voltage, whereby the range of gain change throughout each sweep, once adjusted, is constant regardless of the inspection range selected, so that the indications from a particular range within the specimen, as obtained at different times or by different personnel, are comparable.

---

This invention pertains to improvements in apparatus, such as ultrasonic testing apparatus, which uses a cathode ray tube indicator for displaying signals derived from the reception of reflections from interfaces or discontinuities within a region subjected to probing pulses. While the invention will be described herein as applied to an ultrasonic testing device, it will be recognized by those skilled in the art that its special features will also be useful in other applications of cathode ray tube displays or indicators, and the invention is therefore not to be considered as limited to any particular application except as may be required by the scope of the claims appearing at the end of this specification.

Known cathode ray indicators and display systems incorporate means for indicating pulse travel times and similar parameters by the use of a time-dependent sweep for one direction of travel of the cathode ray spot across the tube face, travel in the other direction or axis (orthogonal to the time axis sweep) ordinarily indicating the amplitude of a received echo or reflection produced in the material being tested as a result of the introduction of a probing pulse into the material. In the case of ultrasonic testing, the probing pulse is a short burst (usually several cycles in length) of an ultrasonic compressional wave introduced into the material being investigated. In other applications, it may be of different form and kind, but in any case defects, boundaries or discontinuities in the specimen material indicate their presence by their reflection of energy to a pick-up or transducer which delivers a corresponding signal to the cathode ray tube. By initiating probing pulses in synchronism with the time-axis sweep of the cathode ray tube, the latter may be caused to display graphically the locations and (in many cases) the nature of the discontinuities in the specimen.

It is a characteristic of pulse probing-type material testers that the magnitudes of reflected energy pulses vary in dependence upon the nature of the discontinuity, its distance within the specimen from the entry face, and the attenuation of the material or layers encountered by the incoming probing pulse as well as (in the return path) the reflected pulse. When a system of the type under consideration is adjusted so as to display the echos from a particular range of depths within the specimen, it is conventional to adjust the time sweep of the cathode ray tube accordingly, so that the useful information will substantially fill the screen of the oscilloscope in the time sweep direction, and thus permit most accurate indication of the positions and character of the displayed information echos. The prior art has also recognized that echo pulses from within a space or specimen being investigated suffer different degrees of attenuation, depending upon the distance within the specimen which has to be traversed both by the inbound probing pulse and the outbound reflection pulses.

To overcome this variation in the energy of the echo information delivered to the display device, various forms of time-dependent gain control have been developed, so that the gain or amplification factor of the channel delivering the reflection information to the display will be higher for information returning from deeper layers within the specimen. One way of achieving this kind of operation has been to provide an amplifying system whose gain will be increased automatically during each display cycle, and then returned to a nominal value ready for commencement of the next sweep cycle of the oscilloscope. However, the proper operation of this kind of time-dependent gain control requires that the operator select the correct value of "slope" for the amplifying characteristic whenever he selects a new range of investigation, because otherwise the results or indications for different inspection ranges will not be directly comparable, and significant information may even be obscured and lost. In instruments intended for use by personnel who are not specially trained in the operation of electronic equipment (even though they may be extremely competent in their own fields), it is desirable that the number of different controls be minimized, and that proper operation involve a minimum of attention to the testing equipment, so that the user's attention may be directed primarily to the phenomena under investigation rather than to the manipulation of the testing equipment.

It is accordingly a principal object of the present invention to provide an instrument of the above type in which the action of the operator in selecting a particular range of depths within the specimen or space under test automatically controls the slope, or rate-of-change, of the time-dependent gain of the signal amplifying channel.

Another object of the invention is to provide such an equipment in which the actual value of the dynamic range of the controlled-gain channel can be selected at will by the operator, but when once selected, will cause the proper corresponding value to be provided regardless of changes in the displayed time range or distance range being investigated.

Still another object of the invention is to provide, in a system of the above kind, a very simple means for delaying the action of the gain-increasing function for an initial period following the generation of each probing pulse.

These and other objects and advantages of the invention, as will appear hereinafter, are achieved by providing the cathode ray display system with a signal amplifying channel whose gain control is in turn controlled by an amplified counterpart of the oscilloscope time-axis sweep wave. Since the selection of the time range of interest necessarily involves an alteration in the sweep generator for the time axis, this interconnection results in an automatic interaction of the selected range and the rate-of-increase of the gain of the signal channel. Further, the system provides for a purposeful alteration, when desired, of the total dynamic gain provided during the sweep cycle, without loss of the automatic and desired coordination of the so-selected dynamic range with selection of the inspection range or depth that is desired by the operator from time to time. Finally, the equipment includes a provision for limiting the action of the automatic time-controlled gain circuit to less than all of the entire sweep cycle, so that an early portion of the displayed information (for example) may be subjected to minimum gain (for clutter reduction) while the remainder only will be subjected to the time-dependent increasing amplification described above.

In the following description, the invention is treated as applied specifically to an ultrasonic testing apparatus for investigating the fleshing characteristics of live animals such as cattle, hogs, sheep and the like, but it is of more general application as indicated above. In the accompanying drawings, FIG. 1 is a simplified graphical representation of the paths taken by probing pulses and echos or reflection pulses in materials having layers of differing pulse propagation properties.

FIG. 3 is a schematic wiring diagram of an instrument conforming to the FIG. 2 system.

Figure 1:
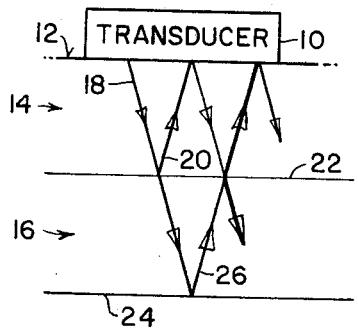

Referring first to FIG. 1 of the drawings, numeral 10 indicates a typical ultrasonic pulse transducer whose face is applied to the outer layer or hide 12 of an animal being tested. Numeral 14 indicates a layer, for example, of back fat, covering a layer of muscle indicated at 16. Since these layers have different propagation parameters for the ultrasonic probing pulses developed by transducer 10 when the latter is stimulated by a suitable electrical driving pulse, reflection of energy will occur at each interface. The transducer is shock-excited periodically, usually at a pulse repetition rate of the order of one or two thousand pulses per second, and between pulses, the transducer "listens" for echos or reflections from within the specimen.

Numeral 18 designates a typical path of a probing pulse from transducer 10, and numeral 20 indicates a possible path for reflection of its echo toward the same transducer. The arrival of this echo at the transducer will, of course, be delayed with respect to the initial probing pulse by a time that depends upon the depth of layer 14 and its velocity of propagation constant (namely, by the round-trip propagation time), and the echo pulse will represent only a fraction of the energy contained in the probing pulse, due to the attenuation in the fat layer as well as the fact that no interface constitutes a perfect reflector. A portion of the energy of the original probing pulse also proceeds across the fat-muscle interface at 22 to the lower boundary of the muscle layer at 24, and a portion is thereupon reflected back to the transducer as at 26. The spacing of the probing pulses produced by the transducer is selected so that all of the reflections of interest will have arrived back at the transducer before the next probing pulse is initiated.

It is clear from FIG. 1 that reflections from the layers or interfaces more remote from the transducer or the hide are not only differentially delayed with respect to the probing pulse, but are also subjected to attentuation by absorption and multiple reflections within the layers such as 14 and 16. In order to display all of the echos that are of interest with adequate brightness or visibility, the gain or amplification factor of the equipment involved in the "listening" process, between probing pulses, is automatically increased during the listening interval, because, in general, the echos suffering the longest delays are also those which are more attenuated in amplitude. In known instruments providing such automatic gain control, the slope of the gain control characteristic, or the rate at which the gain is increased after the occurrence of each probing pulse, is fixed. However, where an instrument of this kind is provided with adjustments for varying the depth range being investigated, it is necessary to vary the selected slope value of the gain control circuit for each change in depth range, so that compensation for the total attenuation in the specimen can be accomplished. Failure to make this adjustment correctly can easily lead to the inadvertent suppression of information that would otherwise be obtained, and the necessity for such adjustment, even when understood, diverts the user's attention from the observations desired to be made.

The invention overcomes the necessity for an independent adjustment of the time-controlled gain characteristic by utilizing the output of the cathode ray tube sweep generator itself to cause the automatic selection of a suitable slope value for the time-controlled gain factor. In this way, the invention causes the dynamic change in gain over the selected and displayed range of echo pulse depths to be a constant, independent of the actual range that is selected by the user. The advantages of this feature, in terms of correctness of the displayed indications, reduction of interface or entry-face clutter, and the like, have been mentioned above.

Figure 2:
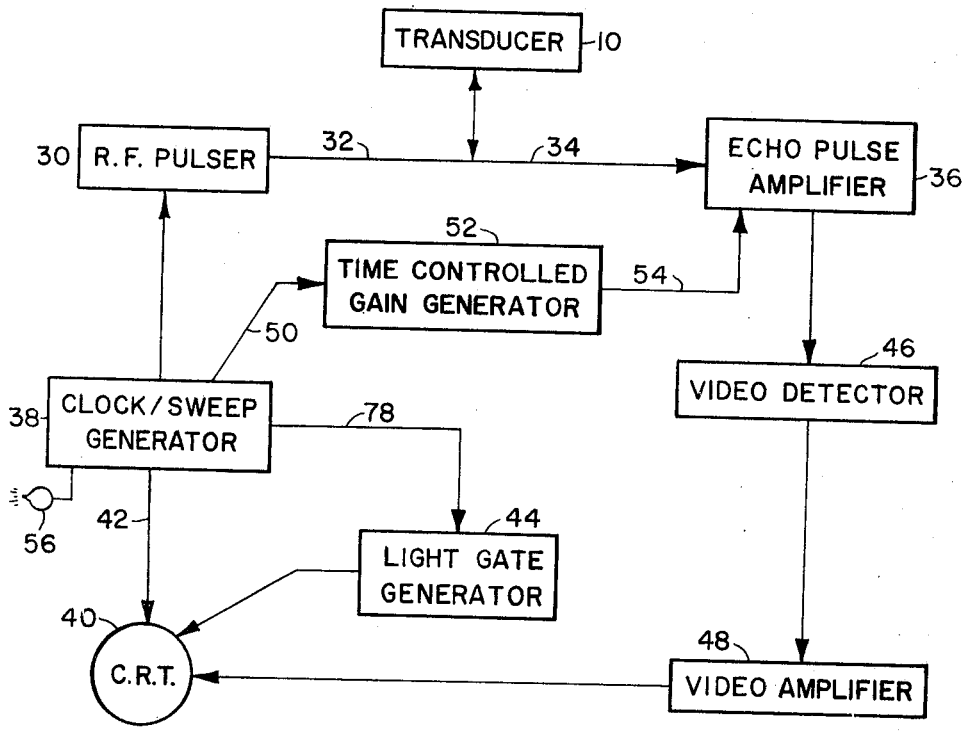
FIG. 2 is a block diagram showing the major components of an ultrasonic testing equipment incorporating the present invention.

The application of the inventive concept to a typical instrument is indicated by the block diagram, FIG. 2 of the drawings. Numeral 10 again designates a typical transducer, which may be a piezoelectric crystal suitable both for ultrasonic longitudinal compressional-wave pulse production, when suitably excited, and for conversion of the reflection pulses to electrical signals to be amplified and displayed. The source of electrical pulses to excite transducer 10 is indicated as a typical radio frequency pulser 30, whose output is applied to the transducer over path 32. Signals from the transducer due to reflections from within the test specimen are conveyed over 34 to the echo pulse amplifier 36.

Typically, the ultrasonic frequency employed may be of the order of from one to three megacycles per second for animal investigations, but much lower frequencies are suitable for other purposes. The short bursts or wave trains of this frequency, constituting the probing pulses, will usually occupy only a few microseconds, and will be repeated at the rate of a thousand or two thousand per second, depending upon the depth range of interest. Conventionally, the repetition rate of the probing pulses is established by the same source which controls the time-axis sweep frequency of the cathode ray oscilloscope. Thus, in FIG. 2, the RF pulser 30 is shown as triggered periodically from the clock or timing source generator 38, which also provides timing for the sweep deflection of the cathode ray tube 40 over lead 42, and via the light-gate generator 44 provides the known light-gate or trace-brightening pulses which allow the cathode ray beam to activate the display screen during each sweep and accomplish its suppression during the retrace intervals between sweeps.

Energy pulses returned to the transducer 10 following each probing pulse are amplified by the echo pulse amplifier 36 whose output proceeds through the video detector 46, the video amplifier 48, and to the cathode of the cathode ray tube. Accordingly, reflected pulses are displayed as pips on the cathode ray tube screen, spaced along the time axis under control of the sweep control in the known maner. Conventionally, the echo pulse amplifier 36 is provided with means for causing the gain thereof to rise during a major portion of the sweep interval, so that the later and more attenuated reflection pulses are amplified a correspondingly greater amount. In order for the slope of this gain increase to be correct where different values of sweep interval are selected, an independent gain-slope control would require adjustment for each different inspection depth selected.

In accordance with the present invention, the proper value of slope for the time-dependent gain control of amplifier 36 is automatically obtained, for all values of sweep duration, by dynamically controlling the gain of amplifier 36 directly from the sweep generator 38. A portion of the output of generator 38 is thus applied over lead 50 to the time controlled gain generator 52, and the output of the latter is suitably applied to the echo pulse amplifier 36 as at 54 to effect the desired gain-varying action. The gain control function of generator 52 can thus be varied not only to synchronize the gain increases of the echo pulse amplifier with the sweep intervals, but also to control the differing rates of gain increase necessitated if constant dynamic range is to be provided for different selections of displayed range. A manual control for range selection is indicated at 56. Operation of this single control thus selects the desired inspection depth in the specimen, provides the corresponding sweep rate for the oscilloscope time axis, initiates the gain increase of the echo pulse amplifier at the correct instant in each sweep, and varies the rate of such gain increase to provide the proper dynamic gain or slope of gain increase to fit that selected displayed range. Also, as will appear, the time controlled gain generator provides for delaying the commencement of the gain-increasing function for a short interval following each probing pulse, where this is desired. Finally, the generator 52 may include provision for a manual adjustment or selection of the total dynamic gain of the echo pulse amplifier, in such a way that the selected value will nevertheless be constant for all selected values of the displayed range.

All of the above features and functions are provided in the complete circuit detailed in FIG. 3 of the drawings, only conventional power supply circuit provisions and the like having been deleted for greater clarity. In this figure, sections corresponding to the labelled blocks of FIG. 2 have been designated by the same reference numerals, additional references being supplied for the components directly related to the novel aspects of the circuit, or where the function of a component is not otherwise obvious to those skilled in the art. Thus, the crystal transducer 10 is shown as controlling the periodic discharge of an LC resonant network 58, 60 whose storage capacitors 60 are normally held charged through inductance 58 and a hold-off diode 62. When thyratron tube V1 is rendered conductive by a trigger pulse on lead 64 from the sweep generator 38 (V9), differentiated by the capacitor 66, the energy in capacitors 60 is quickly discharged across the transducer, providing the probing pulse into the specimen.

The clock and sweep generator 38 comprises a phantastron oscillator (V9) of the free-running type, so designed that it provides a quiescent period between the quasi-stable states during which the sweep wave is generated by the run-down of plate voltage. The period of this run-down is controlled by the time constant of an RC network including the adjustable resistor 56 (see also in FIG. 2) for selection of the search depth in the specimen, and the capacitor 68. The resulting sawtooth sweep wave is applied over conductor 42 to the time-axis deflection control of the cathode ray tube 40, here shown as a deflection plate of the usual pair of such plates. Diodes 70 clamp the starting voltage level of the sweep wave to ground. Its amplitude is independent of the selected repetition rate, which is established by the time constant of the RC circuit 72, 74 and the run-down period of the sweep wave due to the coupling of the latter through the same capacitor 74 to the third grid of tube V9. Accordingly, the longer the period of the sweep wave as selected by control 56, the longer will be the quiescent period of the phantastron, and the repetition rate is a direct function of the sweep speed (of the cathode ray spot across the tube face), yielding approximately constant spot brightness. It may be noted that constant amplitude of the sweep wave is essential, particularly in view of the fact that the invention utilizes this wave to effect automatic control of the time-dependent gain of the echo pulse amplifier.

The control grid of the cathode ray tube 40 is normally biased beyond cut-off sufficiently to prevent video echo signals from being visible on the screen. The usual high-voltage divider string of resistors generally indicated at numeral 76 also provides bias voltages for the RF pulser tube V1 and the video amplifier to be described below. In order to overcome the cut-off bias of the cathode ray tube, during the period when echos are to be displayed, a lead 78 from the sweep generator conducts a part of the sweep voltage to the high gain amplifier and inverter tube V11 driving the cathode follower stage V10, whose low impedance output at 80 is coupled to the control grid of the cathode ray tube over capacitor 82.

Returning now to the transducer 10, its excitation by returned echo pulses produces electrical signals that are applied over conductor 34 (as in FIG. 2 also) to the echo pulse amplifier 36 comprising (in the circuit shown) cascaded pentode vacuum tube amplifiers V2, V3, V4 and V5. The output of the latter is detected by the diode detector 46, and applied to the final video amplifier stage 48 (V6) over lead 84. As the output signals are intended for intensity modulation of the cathode ray tube, a limiting circuit including diode 86, known as a diode catcher, is used to prevent "blooming" of the trace on the tube screen. Diode 88 is provided to eliminate gridshift in tube V6, since the grid is driven into conduction by the positive-going signals from detector 46. The output from the final video stage is then applied to the cathode of the cathode ray tube 40 over lead 90.

The manual selection of gain for the echo amplifier 36 is accomplished by switch 92 which affords a selection of different bias resistances between the control grid and cathode of V3. Additionally, and more significantly for the purposes of the present invention, the gains of all of the first three stages V2, V3 and V4 are controllable in unison by the interconnection of their No. 2 grids via zener diode 94 to the output lead 54 from V7. This tube is connected as a cathode follower having its control grid supplied with an amplified and inverted portion of the sweep wave (from V8) and provides a low impedance output wave to the second grids of the three controlled-gain video stages V2, V3 and V4. The zener diode 94 accomplishes the important function of removing the DC component from the output of V7 resulting from the direct coupling between V8 and V7. By selecting a zener diode with a particular breakdown voltage, either all of the DC component, or a portion of it, or a portion of the AC component derived from the plate of V8 may be prevented from energizing the screen grids of the controlled amplifier stages V2, V3 and V4. Accordingly, the starting of the time controlled gain action may thus be delayed a selected amount after initiation of the probing pulse by pulser 30, which is a desirable feature in some applications of the equipment.

The dynamic range of the time controlled gain generator is governed by the fraction of the sweep wave voltage of V9 which is applied to the control grid of tube V8 over lead 50. A potentiometer 96 allows this fraction to be chosen as desired, but it is emphasized that once potentiometer 96 has been set, the selected value of dynamic gain will be provided regardless of the choice of sweep ranges (inspection depth) accomplished by the range control potentiometer 56. Potentiometer 96 merely allows the selected value of dynamic range to be varied when desired, and for direct intercomparison of test results between instruments or from time to time, it would be maintained at a standard setting.

It is emphasized that the invention is to be distinguished from mere gain-compensation systems as known in the prior art, and that it is of particular utility where extensively stratified test subjects would without it produce a multiplicity of very confusing echo patterns or "clutter" tending to conceal the major boundaries therein. In the case of an animal, these multiple lawers include for example, the hide, fat, membranes between fat layers, the marbling, muscle, rib casing and so on, of which only certain major boundaries are of interest to the user and must be clearly resolved by the equipment. This particular application is also a good example of a field in which it is highly desirable that readings taken at various times and locations, and by different users, should be directly comparable with one another in the interest of standardization of results.

While the circuit described utilizes vacuum tubes in its various stages, the invention is obviously not limited to such a design, for the fully equivalent transistor circuitry can readily be visualized. This and other obvious changes and modifications in the apparatus which fall within the scope of the claims are intended to be included in the invention.

What is claimed is:

1. In apparatus for displaying pulse reflections along the time sweep axis of a cathode ray oscilloscope, in combination, a cathode ray tube including at least one ray-deflecting means and an intensity-control electrode, an adjustable sweep generator connected to said ray-deflecting means, a transducer for converting reflection pulses to electrical signals, a signal amplifying channel connected from said transducer to said intensity-control electrode, and means controlled by the ramp output of said sweep generator for cyclically controlling the gain of said amplifying channel to vary its gain as a function of the amplitude of said sweep generator output throughout at least a major portion of each sweeping cycle.

2. Apparatus in accordance with claim 1, and means for adjusting the rate at which said gain-controlling means varies the gain of said amplifying channel during said portion of each sweeping cycle.

3. Apparatus in accordance with claim 1, including means for limiting the gain-varying operation of said gain-controlling means to a later portion of each sweeping cycle.

4. In apparatus for displaying pulse reflections along the time sweep axis of a cathode ray oscilloscope, in combination, a cathode ray tube including a pair of orthogonally acting ray-deflecting means and an intensity-control electrode, an adjustable sweep generator connected to one of said ray-deflecting means, a transducer for applying to a test specimen ultrasonic wave pulses and for converting reflection pulses from such specimen to electrical signals, an electrical pulse energy source for applying driving pulses to said transducer under control of said sweep generator, a signal amplifying channel connected from said transducer to said intensity-control electrode, and means controlled by the output ramp of said sweep generator for cyclically controlling the gain of said amplifying channel to vary its gain as a function of the amplitude of said sweep generator output, progressively throughout at least a major portion of each sweeping cycle.

References Cited
UNITED STATES PATENTS

| | | | |
|---|---|---|---|
| 2,941,151 | 6/1960 | Goldbohm et al. | |
| 3,033,029 | 5/1962 | Weighart | 73—67.8 |
| 3,287,962 | 11/1966 | Relyea et al. | 73—67.9 |

RICHARD C. QUEISSER, *Primary Examiner.*

JOHN P. BEAUCHAMP, *Assistant Examiner.*